United States Patent

[11] 3,614,016

| [72] | Inventor | James E. Rieth<br>2315 Okemos, S.E., Grand Rapids, Mich.<br>49506 |
|---|---|---|
| [21] | Appl. No. | 20,934 |
| [22] | Filed | Mar. 19, 1970 |
| [45] | Patented | Oct. 19, 1971 |

[54] APPARATUS FOR CONTROL DEPTH FISHING
17 Claims, 5 Drawing Figs.

[52] U.S. Cl. .................................................. 242/106,
43/27.4, 43/43.12, 242/107.4, 242/147
[51] Int. Cl. .................................................. A01k 89/02,
A01k 89/04
[50] Field of Search ........................................... 242/106,
84.8, 107.4, 96, 86.5, 147; 43/6.5, 27.4, 43.12

[56] References Cited
UNITED STATES PATENTS

| 585,059 | 6/1897 | Sylvester | 242/106 |
| 2,099,153 | 11/1937 | Walker | 242/84.8 |
| 2,400,589 | 5/1946 | McArthur | 242/107.4 |
| 2,776,644 | 1/1957 | Fontaine | 242/107.4 X |
| 2,919,489 | 1/1960 | Espinosa | 242/106 X |
| 3,147,935 | 9/1964 | Wilson | 242/86.5 A |
| 3,295,787 | 1/1967 | Golonka | 242/106 X |
| 3,417,502 | 12/1968 | Thomas | 43/6.5 X |

Primary Examiner—George F. Mautz
Assistant Examiner—Gregory A. Walters
Attorney—Price, Heneveld, Huizenga & Cooper ABSTRACT: A reel of large diameter and having a handle is mounted on a base. It includes indexing apertures in its side which are arranged in a circular fashion, equidistant from each other on the circle. Line can be wound onto and unwound from the reel. Reel rotation can be stopped by a pin, mounted on the base, which is biased towards engagement with any one of the apertures. A blocking surface is provided on the base which can engage a handle on the pin when the pin is rotated to one position and thereby prevent the pin from engaging an indexing aperture. When the pin is rotated, the handle moves out of engagement with the blocking surface and the pin moves towards the indexing apertures. The base can be secured to a transom-type mounting bracket or to a deck mounting plate.

INVENTOR.
JAMES E. RIETH
BY
ATTORNEYS

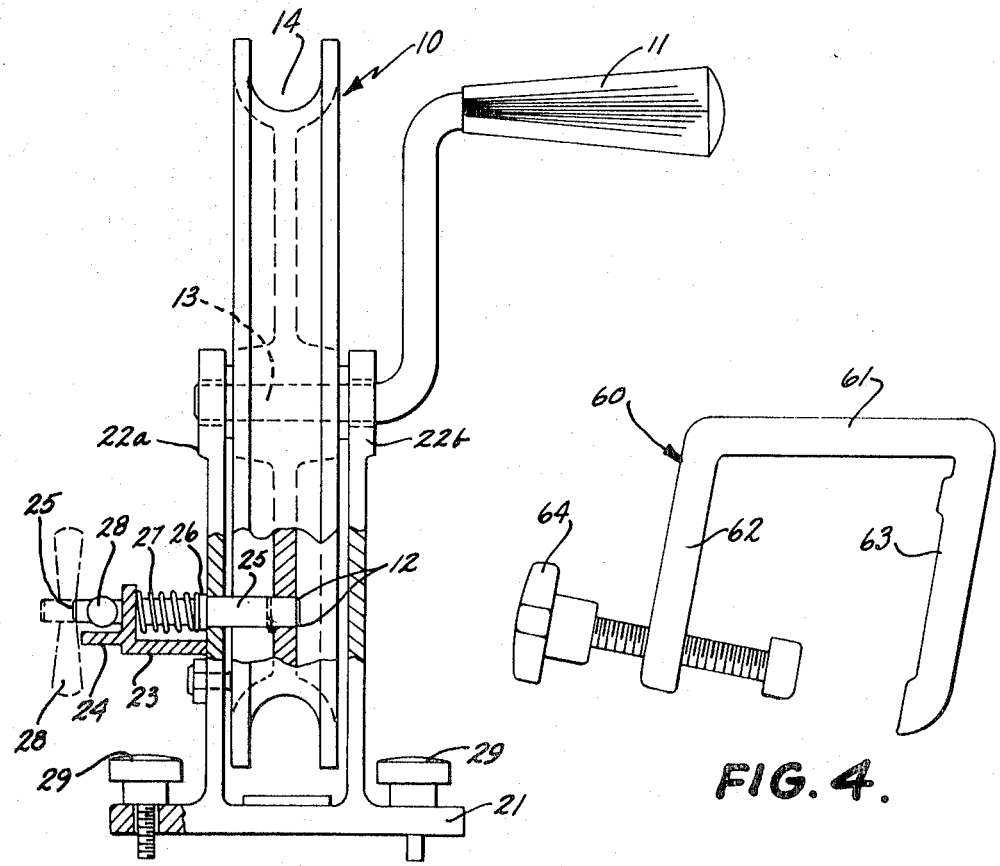
FIG. 3.
FIG. 4.
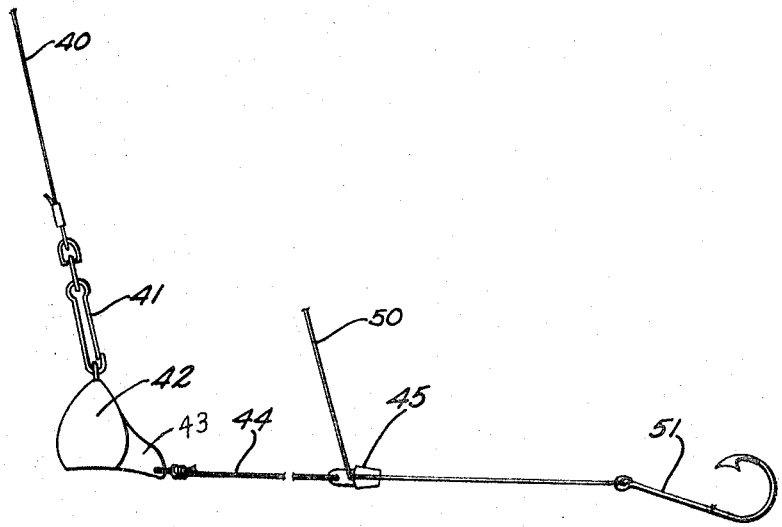
FIG. 5.

3,614,016

APPARATUS FOR CONTROL DEPTH FISHING

BACKGROUND OF THE INVENTION

It is known that a given type of fish has an affinity for water of a particular temperature. Furthermore, it is known that to a great extent, water stratifies into different temperature layers. Thus, when trolling for fish to be found in water of a particular temperature, it is desirable to keep the trolling lure in a layer of water of that particular temperature.

In order to accomplish this, the desired depth is first determined by using a temperature indicator or simply by trial and error. Then, a heavy weight is secured to a control line. A short line is fastened to the control line near the weight and it has a clip at its free end. The trolling line is then clipped to the control line by means of this clip. The lure on the end of the trolling line is allowed to trail 15 to 40 feet behind this clip. This rig is then reeled out until the heavy weight reaches the desired trolling depth.

Frequently, the problems encountered in fishing according to this method stem from the lack of a quality mechanism for reeling out the control line 40 and controlling its depth. Control lines sometimes snap due to sudden shocks applied to the line. These shocks may be caused by the weight 42 hitting the bottom of the lake. Similarly, sudden shocking forces are caused by the actions of waves and surface currents hitting the control line.

Furthermore, existing reels indicate depth only extremely roughly because more line per revolution will unwind from a full reel than from an empty or partially empty reel. Further, revolutions are usually approximated and there are no effective means for stopping the reels from unwinding after the desired depth is reached.

Reels are available for depth finding in which a fixed length of line is unwound in a single revolution regardless of how much line is remaining on the spool. However, such reels accomplish this result by using a line-arranging mechanism whereby the line is wound onto an elongated spool. Additionally, only one or two layers of winding are wound onto the spool.

Such mechanisms are not at all satisfactory for control depth fishing. For one thing, it is preferable to use steel line to carry the heavy weight which is needed to maintain the end of the line at a particular depth. This heavy weight keeps the control line extending generally vertically downwardly regardless of the fact that the boat is moving at a fairly high speed. Such heavy line does not readily wind onto a spool in an orderly fashion. Additionally, a control depth reel must be a sturdy mechanism having as few moving parts as possible since it will undoubtedly see a great deal of action on a good day; and it will constantly be exposed to the elements when in use.

The object of the present invention is to provide a mechanism for control depth fishing which avoids the drawbacks of existing gear. A reel is provided for winding line onto the reel. Means are operably associated with the reel for absorbing shock forces acting on the line. Thus, this invention absorbs shocks on the control depth line no matter how they are caused.

In other aspects of the invention, means are associated with the reel for preventing it from rotating when the desired depth is achieved. Means are associated with the reel whereby the length of line unwound at any given point can be determined. The ratio of the length of line wound on the reel to the diameter of the reel is such that a given revolution of the reel unwinds a relatively fixed amount of line regardless of the amount of line which has previously been unwound from the reel.

Thus, rotation of the reel provides an accurate measurement of line unwound, regardless of how much line remains on the reel. Furthermore, this is done without the use of elaborate line-arranging equipment. The line is wound onto the reel in a random manner.

Finally, a novel weight is provided which simplifies the rigging. It also reduces the cost of the rigging.

BRIEF DESCRIPTION OF THE DRAWINGS.

FIG. 3 is an end view of the reel assembly;
FIG. 4 is an end view of the transom mounting bracket;
and
FIG. 5 is a schematic showing the line rigging for control depth trolling made possible by the novel weight.

PREFERRED EMBODIMENT

Figure 1:
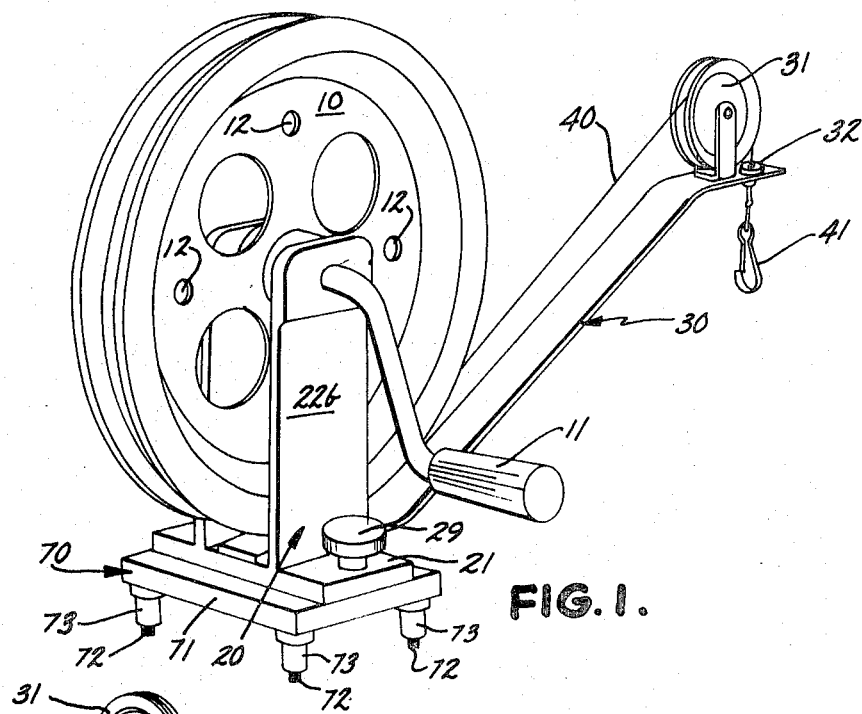
FIG. 1 is a right side perspective of the reel assembly.
Figure 2:
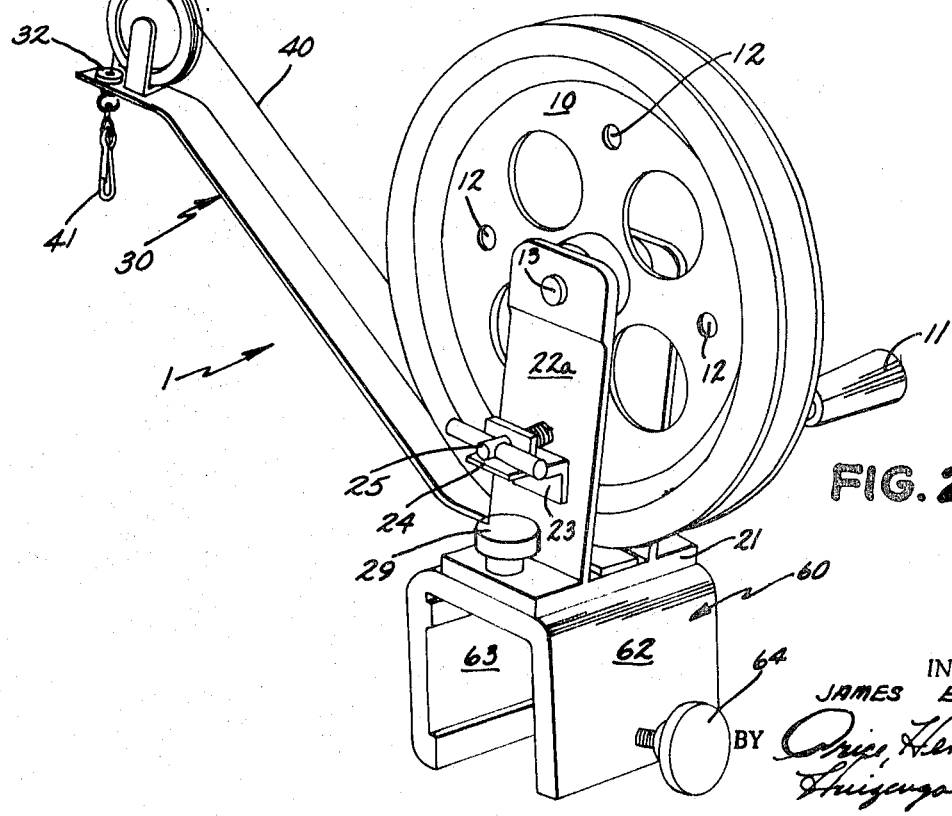
FIG. 2 is a left side perspective of the reel assembly.

The reel assembly 1 includes a reel 10 secured to a reel mounting assembly 20, a flexible arm 30 extending upwardly from the base 21 of reel mounting assembly 20 and line 40 wound on reel 10 (FIGS. 1 and 2). FIG. 1 shows assembly 1 secured to deck mount 70 while FIG. 2 shows reel assembly 1 secured to transom mount 60.

Reel 10 is a cast aluminum wheel of large diameter. The perimeter of reel 10 is channel shaped forming winding channel 14 whose sides slope downwardly towards the center of the channel (FIG. 3). Handle 11 includes an axle portion 13 to which reel 10 is secured by means of a set screw or the like. Extending through reel 10 from one side to the other are four indexing apertures 12, three of which are visible in FIGS. 1 and 2. These are arranged in a circular fashion and are equidistant from each other on that circle.

Reel mounting 20 comprises a base 21 and a pair of arms 22a and 22b which extend upwardly from base 21 (FIG. 3). There are holes in the top of each arm 22a and 22b so that the axle portion 13 of handle 11 passes through and is carried by arms 22a and 22b. In this manner, reel 10, by being mounted on the axle portion 13 of handle 11 is sturdily mounted between arms 22a and 22b. Thus the line is restrained by the arms 22a –22b from unwinding or winding, except in conjunction with the rotation of the reel.

Secured to arm 22a is a stop pin mounting bracket 23 (FIGS. 2 and 3). This extends outwardly from arm 22a and then upwardly, with the upwardly extending portion including a hole through which a stop pin 25 extends. There is a parallel hole through arm 22a such that stop pin 25 extends through and is slidably and rotatably mounted in both the mounting bracket 23 and arm 22a. Pin 25 includes a flange 26 which limits the extent to which pin 25 can be slid through the hole in arm 22a.

The apertures 12 in reel 10 are arranged in a circle whose radius is such that reel 10 can be rotated to a position such that any one of the apertures 12 will be parallel to the hole in arm 22a through which pin 25 extends (FIGS. 1 and a). Flange 26 on pin 25 is located such that pin 25 will extend sufficiently far through arm 22a to engage aperture 12 in reel 10 as shown in FIG. 3. A spring 27 is wrapped around pin 25 and is carried between flange 26 and mounting bracket 23 such that pin 25 is biased towards engagement with apertures 12.

Pin mounting bracket 23 also includes a blocking flange 24 extending horizontally outwardly therefrom as shown in FIG. 3. Pin 25 includes an indexing handle 28 near the end thereof. When pin 25 is rotated so that indexing handle 28 is in a vertical position as shown in phantom in FIG. 3, indexing handle 28 will engage the blocking surface of flange 24 such that pin 25 cannot be forced into engagement with any aperture 12 by bias spring 27. When pin 25 is rotated 90°, then indexing handle 28 will no longer engage flange 24 and pin 25 will be forced into engagement with aperture 12.

Secured at one end to base 21 and extending upwardly therefrom is flexible arm 30 (FIGS. 1 and 2). The opposite end of arm 30 is free to move. Arm 30 is preferably made of some type of spring material such that it will flex when a force is applied to the free end thereof. The end of arm 30 which is fixed to base 21 could be itself spring mounted to facilitate such flex, although this is not necessary where arm 30 is made of a flexible material.

Secured to the free end of flexible arm 30 is a pulley 31 (FIGS. 1 and 2). The free end of arm 30 also includes an eye 32 extending therethrough and being located to the outside of pulley 31, away from reel 10.

A steel control line 40 is wound onto reel 10 in winding channel 14. Preferably, line 40 winds off the bottom of reel 10 and extends upwardly over pulley 31 and through eye 32. A clip 41 is secured to the end thereof. The line is wound onto reel 10 in a random fashion, except to the extent that it tends to be guided towards the center of reel 10 because of the sloping of the sides of winding channel 14.

Secured to line 40 by clip 41 is a heavy weight 42. It has a fin 43 with a small hole therein. Pin 43 provides stability to weight 42 as it travels through the water.

Base 21 of mounting assembly 20 includes a pair of bolts 29, each being located to the outside of an arm 22a and 22b (FIGS. 1 and 2). By means of bolts 29, the entire reel assembly 1 can either be secured directly to a boat by means of bolts 29, or it can be secured to a mounting assembly which in turn is mounted on the boat. In FIG. 1, base 21 is bolted to a deck mount assembly 70. This includes a plate 71, four bolts 72 and well nuts 73 whereby plate 71 can be bolted to the deck of a boat.

Plate 71 is secured to the boat deck by first drilling four holes in the deck. A well nut 73 is inserted in each hole. As is known, a well nut is a rubber nut of T-shaped cross section and has a ferrule in the base of the "T." When a bolt 72 is threaded into the ferrule, the flexible body of the "T" expands causing the well nut to become locked in place in the hole in which it has been placed.

In this manner, the deck plate 71 is secured to the deck by four "shock absorbers" which prevent the plate 71 from causing a fiber glass deck to split. Also, a space is provided between plate 71 and the deck such that plate 71 can be placed on a deck having a curved surface.

In FIG. 2, base 21 is bolted to a transom or gunwale mount 60. This is a generally U-shaped bracket (FIG. 4) having a base 61 and downwardly depending sides 62 and 63. These sides depend downwardly at a slight angle from the vertical with respect to base 61 so that when mount 60 is secured to the sloping gunwale or transom of a boat, the reel assembly 1 which is bolted to base 61 will remain in a generally vertical position. Side 62 includes a bolt 64 extending therethrough. Thus, when bracket 60 is slipped over the side of a boat, with arm 62 and 63 embracing the side of the boat, bolt 64 can be tightened down and thereby rigidly secure mount 60 to the side of the boat.

In operation, a trolling line 50 (FIG. 5) is clipped to the end of control line 40 by means of alligator clip 45. Alligator clip 45 is secured to clip line 44 which in turn is secured to a hole in fin 43 of weight 42 which is secured to the end of control line 40 by means of clip 41. The lure 51 of trolling line 50 is generally allowed to trail about 15 to 40 feet behind alligator clip 45.

The desired fishing depth having been previously determined, the control line 40 is now unwound. The diameter of reel 10 is approximately 0.64 foot such that a single revolution of reel 10 will unwind 2 feet of control line 40. The steel line 40 which is used is preferably about 0.025 inch in diameter. Between 200 and 300 feet of line 40 is wound onto reel 10.

The ratio of the length and diameter of line 40 wound on reel 10 to the diameter of reel 10 is such that a given amount of line which unwinds in a given revolution remains relatively fixed regardless of the amount of line which has previously been unwound from reel 10. If the line were too thick and/or too long, then the winding on reel 10 would be bulky and more line would unwind from a full reel than from an empty one. This would also be true if the reel were too narrow in diameter. However, since 0.025-inch line is preferable, a diameter of 0.64 foot for reel 10 is sufficiently large to accommodate 200 to 300 feet of line 40 without generating this measurement problem.

By observing the relationship of handle 11 to arm 22b, one can count the number of revolutions made of reel 10 and can thereby determine the amount of control line 40 which has been unwound. By observing the relationship of indexing apertures 12 to an arm 22a or 22b, one can even determine the number of partial revolutions made and thereby more accurately determine the amount of line 40 unwound. When one achieves the desired depth, one rotates stop pin 25 to the position shown in solid lines in FIG. 3 and thereby allows spring 27 to force pin 25 into engagement with an aperture 12. This prevents any further rotation of reel 10.

At this point the trolling rig in the water will have generally the appearance shown in FIG. 5. Weight 42 is sufficiently heavy that the angle of control line 40 is minimized in spite of the fact that the boat is moving along at a fair rate of speed. Fin 43 prevents weight 42 from rotating and fouling the rigging. If a fish strikes lure 51, trolling line 50 will pull free of alligator clip 45 and the control line 40 will in no way interfere with the action of the fighting fish on line 50.

If one desires to vary depth at which he is trolling, one merely pulls pin 25 out of engagement with aperture 12 and rotates it to the position shown in phantom in FIG. 3 such that indexing handle 28 engages the end surface or blocking surface of blocking flange 24. One can vary the amount of control line 40 which is played out within 6 inches, because there are four apertures 12 disposed equidistant from each other in a circle on the side of reel 10. Thus, since one revolution of reel 10 plays out 2 feet of line 40, then the rotation of reel 10 from one indexing aperture 12 to the next adjacent indexing aperture 12 will vary the amount of line 40 which is out by 6 inches. Thus, apertures 12 serve the function of an extremely accurate indexing means as well as a means for preventing rotation of reel 10. Control of the trolling depth can be extremely accurate.

As trolling proceeds, the control line 40 will encounter many shocks due to the heavy weight 42 being attached thereto. Some of these shocks may occur because weight 42 strikes the bottom of the lake. While such shocks migh cause control lines to snap in conventional gear, Such shocks will be absorbed in this invention because of the action of flexible arm 30. When a shocking force is applied to line 40, the free end of flexible arm 30 will be free to dip and thereby absorb a good deal of the force which would otherwise act only on line 40. Another shock which may frequently be significant is caused by the action of waves and surface currents against line 40. These two forces are absorbed by the action of flexible arm 30.

The eye 32 in arm 30 allows the lure to be played out at any angle with respect to reel assembly 1 without causing line 40 to jump out of the track of pulley 31. 360° tracking is thus allowed.

Due to the unique mounting concept, a single-reel assembly 1 can be manufactured for use in any type of boat setup. One need merely provide different boat mounting structures to which the reel assembly is fastened by means of bolts 29. Thus, deck mount 70 can be secured to the deck of a boat by means of bolt 72 and reel assembly 1 can be secured to deck mount 70 by threading bolts 29 into plate 71. Similarly, mount 60 can be secured to the transom or gunwale of a boat and reel assembly 1 can be bolted to base 61 by means of bolts 29.

Thus, it can be seen that this invention provides a control depth fishing reel with a number of unique advantages over prior art devices. First of all, the problem of snapped control lines 40 is substantially eliminated because of the action of flexible arm 30. Secondly, the amount of line unwound in a revolution of reel 10 will remain fairly constant, regardless of the amount of line which has previously been unwound. Thirdly, indexing apertures 12 and stop pin 25 provide not only a positive stop mechanism whereby rotation of reel 10 can be prevented, but they also provide a very accurate indexing means whereby the number of revolutions and even partial revolutions of reel 10 can be accurately determined. Finally, the unique mounting concept of the invention facilitates the use of reel assembly 1 on any type of boat, merely by combining reel assembly 1 with an appropriate boat mounting mechanism.

It is understood that the above is merely a preferred embodiment of the invention and that a number of alterations or variations can be made thereof without departing from the spirit and broader aspects of the invention.

The embodiments of the invention in which an exclusive property or privilege is claimed are defined as follows.

1. A reel assembly comprising: a base; a having HAVING a large diameter rotatably mounted on said base; means mounting said reel on opposite sides of said reel for rotation in a winding and unwinding direction; and restraining line from unwinding from or being wound onto said reel except, and only, in conjunction with rotation of said reel; means for winding line on said reel in a random manner, the ratio of the length and diameter of said line to the diameter of said reel being such that a given revolution of said reel unwinds a relatively constant amount of line regardless of the amount of line which has previously been unwound from said reel; locking means for holding said reel in a fixed position whereby rotation of said reel is prevented when desired; and means connected to said base for operable connection to line wound on said reel for absorbing shock forces acting on said line.

2. The reel assembly of claim 1 in which said locking means comprise an aperture in the side of said reel; a stop pin being mounted on said base; and means for engaging said stop pin with said aperture whereby rotation of said reel is prevented.

3. The reel assembly of claim 2 in which said stop pin includes a means biasing said pin towards engagement with said aperture; said base including a blocking surface; said pin including an indexing member for engaging said blocking surface and thereby preventing said pin from engaging said aperture; said pin being rotatable such that said indexing member can be turned out of engagement with said blocking surface such that said pin will be biased into engagement with said aperture.

4. The reel assembly of claim 2 in which there are a plurality of said apertures in the side of said reel, being arranged in a circular fashion and being equidistant from each other on said circle.

5. The reel assembly of claim 1 in which said base includes means for releasably securing said reel to a means for mounting said reel assembly on a boat.

6. The reel assembly of claim 5 in which said means for mounting said assembly on a boat comprises a plate to be secured to the deck of a boat.

7. The reel assembly of claim 5 in which said means for mounting said assembly on a boat comprises a generally U-shaped bracket having two legs and a base with each leg depending downwardly from said bracket base; a bolt, extending through one of said legs, which can be tightened down on the side of a boat when said side is disposed between said legs.

8. The reel assembly of claim 1 in which said line restraining and mounting means comprises a pair of spaced arms extending upwardly from said base; said reel being rotatably mounted between said spaced arms.

9. A reel assembly comprising: a reel mounted on a base; means for releasably securing said reel assembly to either one of a deck plate and a bracket, said bracket having spaced downwardly depending legs; each of said base, said deck plate and said bracket having receiving means thereon for reception of said releasable securing means; means on said deck plate for securing said deck plate to the deck of a boat; means on said bracket for securing said bracket to the side of a boat, with said legs embracing the side of the boat said receiving means on said deck plate and bracket having means securing; said releasable securing means whereby said reel base is secured to either said bracket or said deck plate.

10. The reel assembly of claim 9 in which said means for securing said plate to the deck of a boat comprises a plurality of bolts operably associated with said plate; an equal number of well nuts for insertion into holes in the deck of the boat.

11. The reel assembly of claim 9 in which said legs depend downwardly at an angle with respect to said bracket such that said reel will remain generally vertical when secured to said bracket even though said bracket is secured to the side of a boat which is disposed at an angle with respect to the vertical.

12. The reel assembly of claim 9 in which said means for releasably securing said reel assembly to one of said deck plate and said side mounting assembly comprising: a bolt at either side of said base; a large knurled knob on the head of each said bolt; said deck plate and said bracket, each having threaded holes therein for receiving said bolts.

13. The assembly of claim 10 in which said well nuts extend slightly above the surface of said boat deck when inserted into said holes such that said plate can be flat and still be mounted on a contoured deck without deforming said deck when said bolts are tightened down.

14. A reel assembly for use in control depth trolling wherein a heavy weight is secured to the end of a line comprising: a base; a reel; means for supporting said reel extending upwardly from said base on opposite sides of said reel and restraining line from unwinding from or being wound onto said reel except, and only in conjunction with rotation of said reel; said reel being rotatably mounted on said supporting means for carrying line; a handle on said reel for rotating said reel in both directions of rotation; a flexible arm extending upwardly and outwardly from said base generally in the plane in which said reel rotates for absorbing shock forces on the line on said reel; a pulley mounted on the free end of said flexible arm; and a guide means at said free end of said arm through which line passes after coming over said pulley.

15. The reel assembly of claim 14 in which said supporting and line-restraining means comprises: a pair of spaced arms extending upwardly from said base; said reel being rotatably mounted between said spaced arms.

16. The reel assembly of claim 15 in which the perimeter of said reel comprises a winding channel having sides sloping downwardly towards the center thereof.

17. The reel assembly of claim 14 in which said flexible arm comprises a relatively flat piece of spring steel.